United States Patent

[11] 3,532,061

| [72] | Inventors | Henry L. Bohm,<br>Lakewood, Ohio;<br>Norma D. Bohm, executrix of the estate of said Henry L. Bohm, deceased |
|---|---|---|
| [21] | Appl. No. | 721,499 |
| [22] | Filed | April 15, 1968 |
| [45] | Patented | Oct. 6, 1970 |
| [73] | Assignee | McDowell-Wellman Engineering Company<br>Cleveland, Ohio<br>a corporation of Ohio |

[54] SEPARABLE WHEELED FREIGHT VEHICLE
9 Claims, 17 Drawing Figs.

[52] U.S. Cl. ................................................. 105/159,
 105/367
[51] Int. Cl. ................................................. B61d 3/16
[50] Field of Search ........................................... 105/367,
 159

[56] References Cited
UNITED STATES PATENTS
2,844,108  7/1958  Madden  ................. 105/159
FOREIGN PATENTS
1,092,502  11/1960  Germany  ................. 105/367
1,162,864  2/1964  Germany  ................. 105/367

Primary Examiner—Drayton E. Hoffman
Attorney—McNenny, Farrington, Pearne and Gordon

ABSTRACT: There is provided an improved, wheeled freight vehicle which is characterized in that the vehicle is divisible into two parts and adapted to accept and carry a load between the two parts. The structures of this invention are characterized in that means are provided which enable the load and load carrying members to be moved transversely to the direction of movement of the vehicle, and means are provided for vertically moving the load and the load carrying members relative to the wheels. A class of vehicles to which this invention relates are Schnabel-type railroad cars.

INVENTOR
HENRY L. BOHM
BY
MCNENNY, FARRINGTON, PEARNE, & GORDON
ATTORNEYS

INVENTOR
HENRY L. BOHM

BY
MCNENNY, FARRINGTON, PEARNE, & GORDON
ATTORNEYS

INVENTOR
HENRY L. BOHM

BY
MCNENNY, FARRINGTON, PEARNE, & GORDON
ATTORNEYS

SEPARABLE WHEELED FREIGHT VEHICLE

INTRODUCTION

A railroad car will be used as a primary illustrative example of the preferred embodiment and best mode of carrying out the invention described below, it being understood that the principles of this invention may be applied to other separable wheeled load-carrying vehicles. The Schnabel-type railroad car is known. Briefly, this type of car is one which is divisible into two parts. A load is then supported between the two parts in such a way that the load becomes a part of the overall railroad car. After the load has been delivered to its destination, the front and rear portions of the car are disengaged from the load and coupled together to form a unitary railroad car and transported to the site where another load can be picked up. Generally speaking, the confronting faces of the two car portions between which the load is supported are so adapted and constructed relative to the load that it may be anchored to each of the confronting faces of the car portions at the bottom of the load. Compression pads are provided on each car portion for coaction with the upper marginal edge of the load to be carried. Thus, the load is carried in tension at the lower marginal edges thereof vis-a-vis the confronting faces of the car portions, and in compression at the upper marginal edges thereof.

In recent years the size of electrical equipment, such as generators, has greatly increased. The economics of assembling such large pieces of equipment favors their construction at a site which is remote from the site of intended use and the provision of special means for transporting the finished product to the site of intended use.

When magnitude of weight of such generators reaches as high as 500 tons or as wide as 14 feet, the size of the article becomes much larger than has been heretofore handled conveniently by wheeled vehicle means. For example, the length of a 500-ton electric generator may be as long as about 42 feet. The ordinary railroad car usually does not exceed about 50 feet in length with the centers of the trucks usually about 41 feet apart. Curves, bridges, supporting girders, and upstanding track equipment adjacent the rails exist with lengths of cars of usually about 50 feet in mind. However, a car which is designed to carry a load of 500 tons and approximately 42 feet in length necessitates a much larger supporting structure that is not easily accommodated in a 50-foot car length. Additional problems are introduced by the height and width of such excessive loads since these cannot be simply supported on a flatbed railroad car even though sufficiently structurally designed to withstand loads of the magnitude mentioned because such a car would not be able also to negotiate existing underpasses. Therefore, the load must be supported as close to the track as possible to provide clearance for existing overhead structures, e.g. bridges. These desiderata result in a car-load assembly which greatly exceeds normal railroad car lengths, and therefore introduces new problems for which provision must be made in order to enable such a car-load assembly to negotiate existing railways.

Typical of the problems which occur is the provision on a short-span railroad bridge of girder members which extend vertically above the railroad bed a distance of a few inches to a few feet. If such a bridge is followed by a conventionally designed curve in the track which readily accepts cars 50 feet long, for example, a car which is 160 feet long may not be able to negotiate such a curve unless means are provided for articulating the component parts. Even with such articulation, it is not always feasible to negotiate some railroad curves, and accordingly, this problem has been solved in the present invention by providing means for laterally moving the load and its supporting members relative to the truck assemblies. Still further, it may be found that the load is so sized, and the trackway so constructed, that lateral movement and articulation are insufficient to permit negotiation of a particular section of the trackway. This problem has also been solved in the present invention by the provision of means which enable the load and load-supporting members to be moved vertically relative to the wheels to clear vertically extending obstructions.

Also in cars having a load carried between car portions, track situations arise where not only unevenness may occur but in such lengths, the forward portion of the car may be on a rise out of a dip or vertical curve whereas the trailing portion of the car may just be entering the dip. In preferred embodiments of the present invention, means are provided to permit relative movement of the respective car body portions on a horizontal axis with respect to the truck assemblies.

BRIEF STATEMENT OF INVENTION

Briefly stated, the present invention is in a wheeled vehicle which comprises a pair of separable vehicle portions adapted to be separated and to support a load between the separated vehicle portions. In the preferred embodiment, the separable portions are, insofar as the essential elements are concerned, desirably constructed as mirror images one of the other. One portion includes in combination a wheeled truck assembly, a body portion having inboard and outboard ends; a yoke including trunnion means at its outboard end, said yoke being secured to the body adjacent the inboard end for relative rotation about a horizontal axis. A support is carried by the wheeled truck assembly for the outboard end of said body and the other end of the yoke. Means are provided which coact with the support for laterally relatively moving the support with respect to the wheeled truck assembly. Independently operable means are also provided for vertically moving the outboard end of the body portion.

By such a structure, the body portions and lading can be elevated, and can be moved laterally to either side of the longitudinal center line. The trunnion means renders the apparatus articulated, and thereby able to accommodate the forces imposed when railway curves are negotiated. The transverse horizontal axis of rotation of the inboard end of the yoke eliminates strains encountered by unevenness in the track.

DESCRIPTION OF THE DRAWINGS

The invention may be better understood by having reference to the annexed drawings showing a specific embodiment of the invention and wherein.

DETAILED DESCRIPTION

Referring now more particularly to FIGS. 1A, 1B, 2A and 2B, there is here shown a railroad car embodying the present invention in a preferred form. The railroad car shown generally in FIGS. 1A and 1B comprises a pair of separable vehicle portions which are adapted to be coupled together without a load, or to be separated and to support a load between the confronting faces of the vehicle portions. Considering only the vehicle portion shown in FIG. 1A, there is provided a body portion 10 having an inboard face 12 and an outboard extremity 14. Generally speaking, body portion 10 is of welded box construction having a pair of side girders 16 and 18 of generally triangular configuration, inboard end plate 12 and outboard crosshead 20. The body portion 10 is provided at its lower inboard extremity with a truss hinge 22 through which a truss hinge pin 24 may be inserted. The truss hinge 22 and the removable pin 24 is provided for mating and supporting coaction with a correspondingly configured and mating hinge truss structure, not shown, which is integral with the load to be carried between the car portions. The upper extremity of inboard face 12 is provided with compression plates, for example compression plates 25, 26 and 27. Truss member 28 is desirably provided as a backup for compression plate 26. The design and configuration of the inboard face of car body portion 10 will depend upon the configuration of the load and may be varied to accommodate the load.

Vehicle body portion 10 is supported at its outboard extremity by a support structure generally indicated at 30. In the embodiment shown in FIGS. 1A and 1B, support 30 is carried on a horizontally disposed bed plate 40 secured to equalizer beam 32 which is in turn supported on wheeled trucks generally indicated at 34 and 36. The wheeled trucks are of conventional design and structure. The structure including bed plate 40, a part of equalizer beam 32, is suitably secured to wheeled trucks 34 and 36 by pivot structures 38 and 41, respectively, to allow limited relative rotation about the vertical axes of the pivots. The upper surface of equalizer beam 32 is a bed 40 on which operating equipment may be disposed. On the outer end of truck 34 there is provided a bed 42 on which is carried brake equipment. A coupler 44 of conventional design is also provided on the outboard end of the vehicle portion of FIG. 1A which is adapted to be connected to any other standard coupler in a railroad train. Bed 40 also provides a base for the support 30 and carries ways 46 and 48 on which wheels 50 and 52 roll whereby the carriage 54 is moved laterally to either side of the center line. Hydraulic rams 56 and 58 working in push-pull relation control the lateral displacement of carriage 54. The details of the support and carriage are better shown in FIGS. 6, 6A and 6B. Carriage 54 also supports vertically extensible hydraulic cylinders 60 which coact between the carriage 54 and a roller platen 62 carried at its upper extremity by hinged header 102. Rollers 64 are secured to the upper surface of platen 62 and coact with roller plate 66 carried by the outboard extremity 14 of vehicle body 10 to permit the overhanging outboard extremity 14 to be displaced laterally when pivoting of the body portion 10 about the vertical axis 79 of trunnion 78 occurs as described below.

Figure 1A:
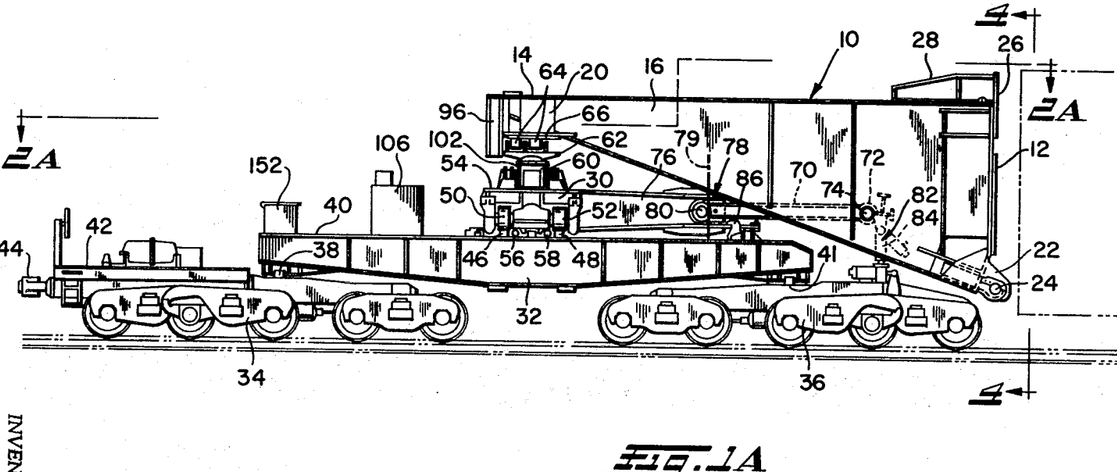
FIG. 1A is a side elevation of a body portion.

The inboard extremity 12 of the vehicle body portion 10 is guided by a yoke 70 which is pivotally secured at its inboard extremity 72 to side girders 16 and 18 of vehicle body 10 by means of pins, e.g. pin, 74 for limited rotation about the horizontal axis of pin 74. Yoke 70 at its outboard extremity is secured to support arm 76 extending in an inboard direction from the support means 30. The connection between the yoke 70 and the support arm 76 is by means of a trunnion generally indicated at 78, and in the preferred embodiment trunnion 78 provides for limited pivoting about a vertical axis 79 and about a horizontal axis 80. Pivoting about the vertical axis 79 of trunnion 78 provides an articulated car in which the body portion 10 may pivot relative to the wheeled truck assembly including equalizer beam 32 and trucks 34 and 36. Also, to accommodate unevenness in the track, pivoting is permitted to occur to a limited extent about horizontal pin 80 as well as about the horizontal axis of pin 74.

There are provided hydraulic jacks generally indicated at 82 which, when the car is empty, are connected at the inboard extremity of yoke 70 to the girder 16 to provide support for the inboard end of the car body 10 on wheeled truck 36. In installing the load between the car portions shown in FIGS. 1A and 1B, hydraulic jacks 84 provide a convenient means for adjusting the elevation of the inboard end of car body 10 for fit-up to load. During carriage of a load, the jacks and tie-down assemblies 82 are disconnected and stored within body 10 as shown in phantom in FIG. 1A so as not to interfere with the movement which body portion 10 must undergo with respect to the wheeled truck assembly in the course of transport.

There is also provided a hold-down hook and lock 86 for the inboard extremity of support arm 76. Hook 86 is secured to the top plate 40 of the main truck equalizer beam 32. The hook serves to hold down the end of the support arm 76 but does not inhibit the lateral movement of the support member 30 when disconnected for shifting.

Figure 6:
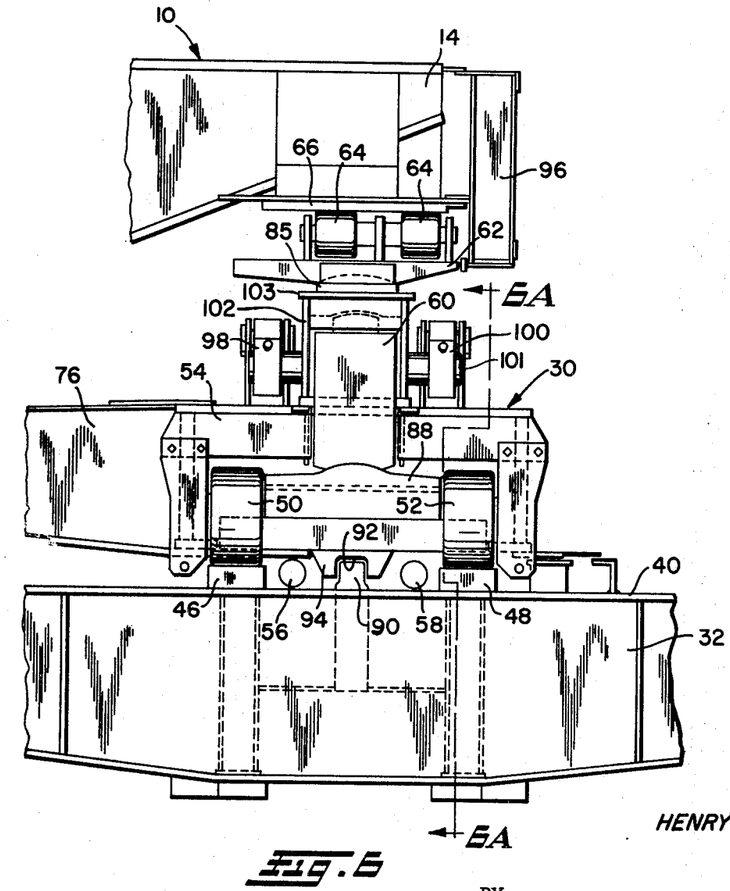
FIG. 6 is a fragmentary view on an enlarged scale showing details of the transverse platen carriage and the apparatus for moving the end of the body portion in a vertical direction.
Figure 6A:
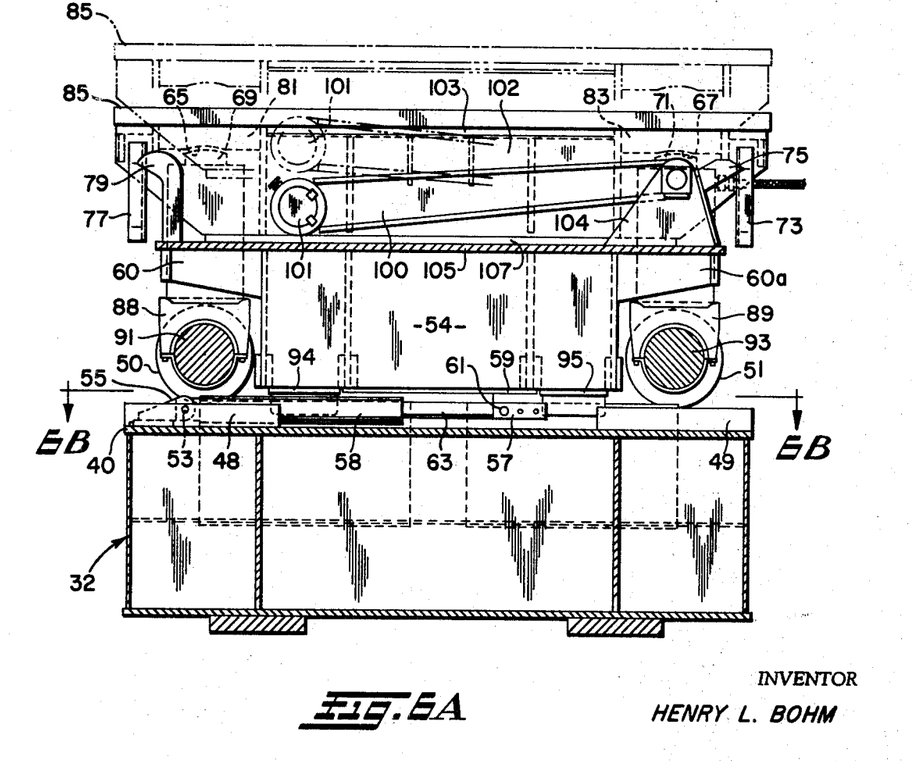
FIG. 6A is a cross-sectional view as the structure appears in the plane indicated by the line 6A–6A of FIG. 6.
Figure 6B:
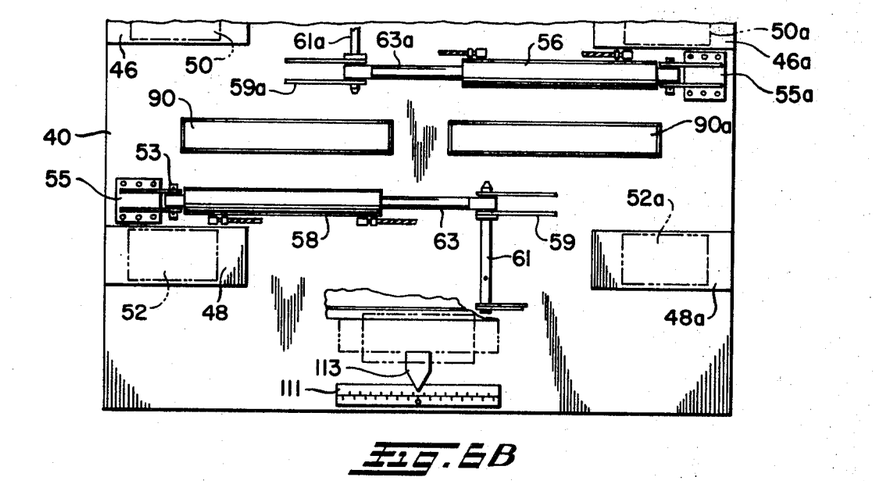
FIG. 6B is a plan view of lateral traverse actuating means as that structure appears in the plane indicated by the line 6B–6B in FIG. 6A.

Referring now more particularly to FIGS. 6, 6A and 6B, there is here shown in partial side elevation an enlarged view of the details of the support means 30.

As indicated above, support means 30 in the preferred embodiment shown in the drawings provides means for supporting the outboard extremity of the body portion 10, means for moving the outboard extremity of body portion 10 vertically, means for moving body portion 10 laterally either side of the center line of the car, and means for supporting the outboard extremity of yoke 70 (FIG. 1A). In general, the support 30 is moved laterally to either side of the center line of the car by roller means. Vertical adjustment is conveniently provided by extensible arm means. Allowance for pivotal action about axis 79 of the outboard extremity 14 of body portion 10 is provided by means for permitting relative radial movement between the support 30 and the outboard extremity 14, e.g. roller means 64.

Accordingly, the support 30 includes a carriage 54 supported on wheels 50 and 52 which are adapted to roll on ways 46 and 48, respectively. Motion of the carriage 54 having the wheels secured thereto in a direction axially of the car is prevented by guide 90 coacting in slot 92 of gib 94 to restrain such movement. Hydraulic cylinders or jacks 56 and 58, desirably operating in a push-pull relation to each other, coact between the top plate 40 on equalizer beam 32 and the carriage 54 for transverse motion. Jacks 56 and 58 also serve to limit the lateral displacement from the center line of the carriage 54, until locked up by bolts.

In order to provide for vertical movement of the outboard extremity 14 of body 10, there is also provided on carriage body 54 of support 30 hydraulic cylinder means 60 (one on either side -- FIG. 2B) which are capable of raising and lowering, within the predetermined limits of extensibility, platen 62 and rollers 64 located on hinged header or platen support member 102. The outboard extremity 14 of body 10 has roller plate 66 (FIG. 12) resting directly on a roller nest such as more particularly shown in FIGS. 8, 9, 10 and 11. Outboard extremity 14 is provided with a stop 96. Stabilizer arms 98 and 100 coact between the platen support 102 and the carriage 54, as better shown in FIG. 3. Hinge 104 (FIG. 3) is secured to carriage 54.

FIG. 6A is the structure shown in FIG. 6 as it appears in the plane indicated by 6A–6A. Thus there are shown wheels 50 and 51 on carriage 54 and having integral therewith axles 91 and 93 respectively. These wheels are adapted to move laterally along ways 48 and 49. Lateral movement is effected, as indicated above, by hydraulic jack means and as shown in FIG. 6A, one hydraulic jack 58 is disposed between a bracket 55 to which it is secured by means of pin 53, bracket 55 being secured, in turn, to deck plate 40 carried on equalizer beam 32. The distal extremity of extensible arm 63 is secured by means of pin 61 to bracket 57 which is in turn secured to the base 59 of carriage body 54. Accordingly, by moving the extensible arm in and out of hydraulic jack 58, the carriage body 54 is caused to move to the right or to the left of the center line of the railroad car. Guides 94 and 95 coact between the base 59 of carriage body 54 and guides such as guide 90 (FIG. 6) to preserve the alignment of the support member. A second hydraulic jack 56 (FIG. 6) is assembled to act in a direction opposite to jack 58 to provide a push-pull effect.

Bolsters 88 and 89 support the lower extremities of lifting hydraulic jacks 60 and 60a which are equipped, respectively, with extensible arms 69 and 71 having convex spherically shaped distal extremities adapted to be received in corresponding concave spherically shaped depressions 65 and 67, respectively, in support blocks 81 and 83 carried in platen support member or hinged header 102. Platen support member 102 is provided with a crowned laterally extending platen engaging beam 85 supported on plate 103. The crowned laterally extending platen engaging beam 85 is adapted to fit into the transverse recess 187 more clearly shown in FIGS. 9 and 10. The mating surfaces are machined to permit slight relative rotation between the platen 62 and the platen supporting beam 85, as well as accommodation of the taper of the rollers, e.g. rollers 196 and 198 of FIG. 11.

As indicated above, stabilizer arm hinges 100 are secured to the platen support body 102 by means of torsion bar 101 at one extremity and to brackets 104 at opposite extremities. Bracket 104 is in turn secured by any suitable means, e.g. welding, to carriage body 54.

Suitable scales 73 and 77 are secured to the platen support 102, and suitable indicators 75 and 79 are secured to bracket 104 and to carriage body 54, respectively, for indicating coaction with the scales.

FIG. 6B is a view showing the location of the traverse jacks 56 and 58 and their mode of attachment to the equalizer plate 40 and the underside of carriage body 54.

By actuating hydraulic jacks 60 and 60a by supplying fluid under pressure thereto in a conventional manner, extensible arms 69 and 71 can be extended the full stroke thereof, for example 12 inches, to effect vertical movement of the platen support 102 relative to the carriage body 54 whereby the outboard extremity 14 may be raised and lowered relative to the equalizer beam 32 any distance, even differentially, within the full stroke of the hydraulic jacks 60 and 60a. Likewise, by hydraulic actuation of hydraulic jacks 56 and 58, the support 30 can be displaced a given distance to either side of the center line of the car. Thus, movement of the load laterally to either side of center, and independent movement of the load vertically, may be effected in order to accommodate conditions of the trackway, and differentially from one car-end to the other.

Support 30 also has extending in an inboard direction therefrom arm 76 partially shown in FIG. 6, the inboard extremity of which supports the trunnion 78 and the outboard extremity of yoke 70.

Thus, it will be seen that support 30 may be moved to either side of the center line a predetermined distance, e.g. 14 inches, to the right or to the left of the center line of the car by means of hydraulic jacks 56 and 58. Also, the outboard extremity 14 of vehicle body 10 may be raised or lowered a predetermined distance, e.g. a distance of 12 inches, by hydraulic cylinders, e.g. hydraulic cylinders 60 and 60a. In the preferred illustrated embodiment, four such cylinders coacting in unison are employed to raise and lower the outboard extremities of body portions 10 and 10' and the load supported therebetween. Still further, because of the articulated nature of the entire car introduced by trunnion 78 and the corresponding member in the opposite car body portion 10', the swing of outboard extremity 14 of vehicle body 10 in response to pivoting about pin 79 is accommodated by the roller nest including rollers 64 secured to platen 62. Substantially one-half of the load of the cargo body is supported on the support structure 30 and the balance on its equal and opposite member. Support structure 30 is desirably located above the midpoint of equalizer 32. The hydraulic mechanisms are conveniently operated from a control station 106 located on platform 40. Raising and lowering of the outboard extremities 14 and 14' by the hydraulic means 60 and 60', respectively, is done with the load in place when the weight of the load and body portions 10 and 10' is carried by the supports 30 and 30', respectively.

Figure 1B:
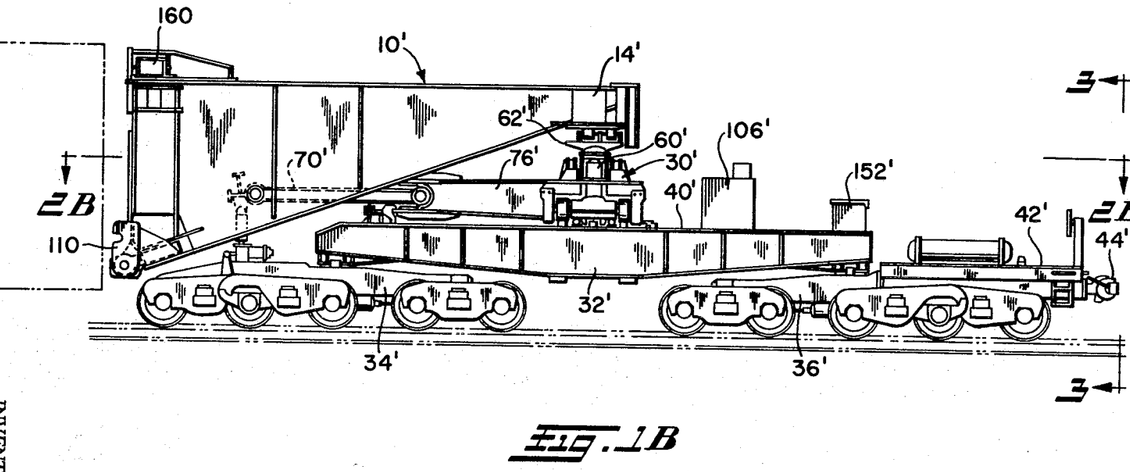
FIG. 1B is a side elevation of an opposite body portion. In dotted lines there is represented a load, e.g. a generator, adapted to be disposed between the body portions.
Figure 2A:
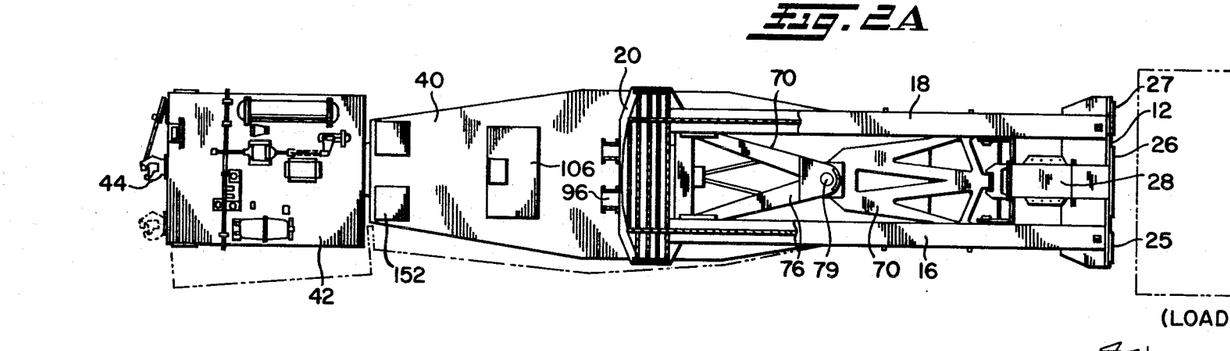
FIG. 2A is a partial plan and partial sectional top view of the body portion shown in FIG. 1A as it appears in the broken plane indicated by the line 2A–2A.
Figure 2B:
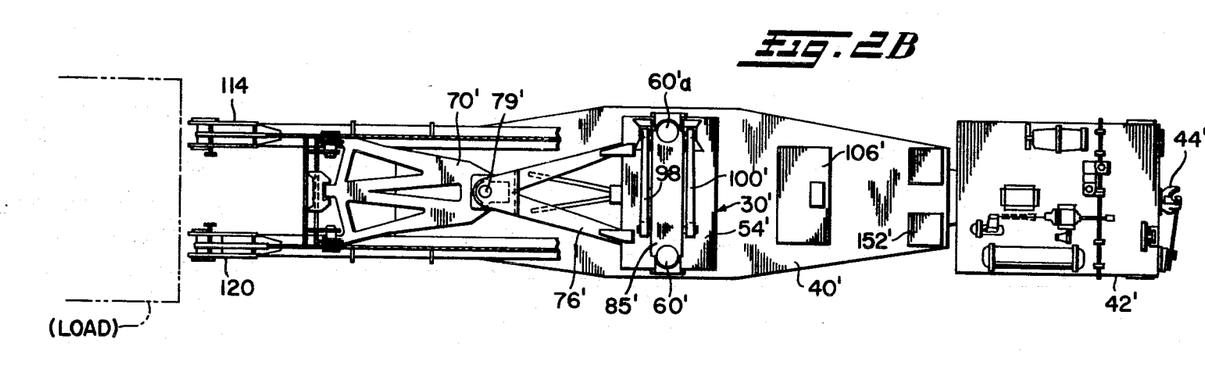
FIG. 2B is a partial sectional top view of the portion shown in FIG. 1B as it appears in the plane indicated by the line 2B–2B.
Figure 3:
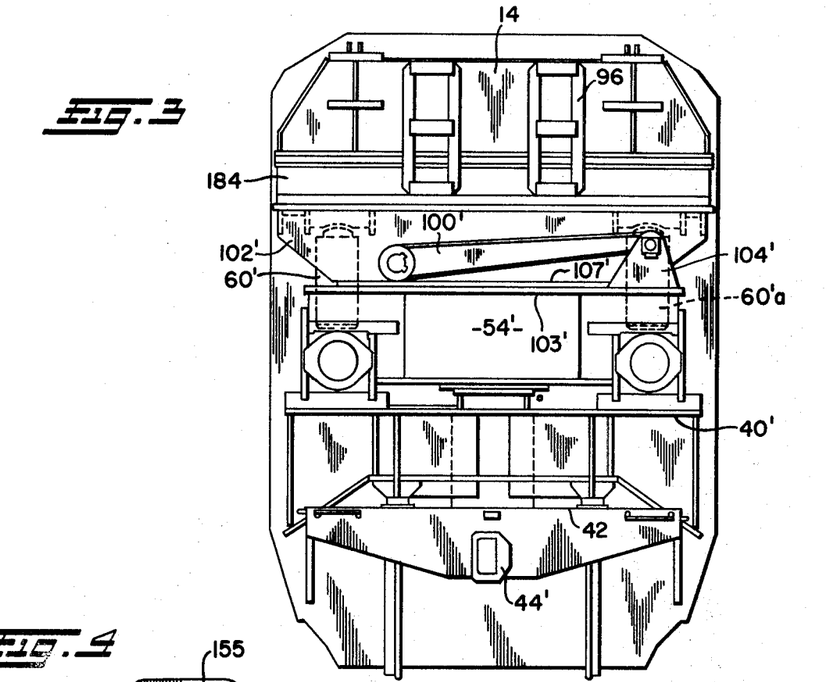
FIG. 3 is an end view of the body portion shown in FIG. 1B as it appears in the plane indicated by the line 3–3.
Figure 5:
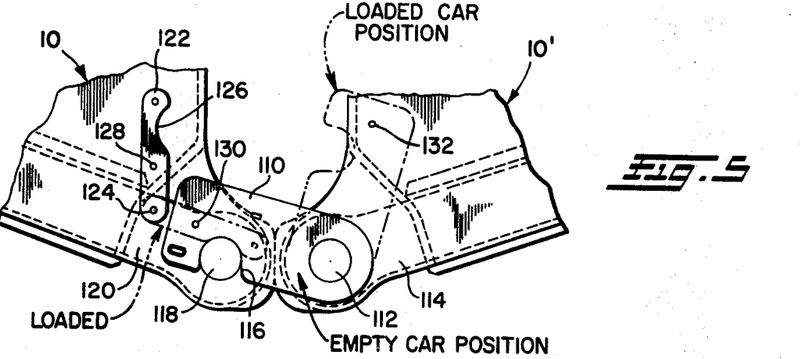
FIG. 5 is a fragmentary side elevation showing apparatus for coupling the body portions of FIGS. 1A and 1B together when the car is empty.

FIG. 5 shows a fragmentary enlarged plan view of the coupling means between body portions 10 and 10' when the car is empty. Coupling 110 is secured by means of pin 112 to end plate 114 on the lower inboard extremity of car body portion 10', and is rotatable about the axis of pin 112. Hook portion 116 coacts with pin 118 (24 in FIG. 1A) secured to end plate 120 on the lower inboard portion of body portion 10. A link bar 122 is pivotally secured to the body portion 10 by means of pin 124 and is rotatable to a position whereby recess 126 rests upon pin 118 when loaded. In such position, a pin may be inserted through hole 128 which is then in alignment with hole 130 in coupling 110 to maintain pin 118 in position. Pins 118 and 112 are removable. As best shown in FIG. 2B, the brackets 114 and 120 comprise multiple, spaced leaves or fingers adapted to receive therebetween corresponding bracket members affixed to the load and provided with apertures to receive pins 112 and 118 therethrough. In this manner, the load indicated by dotted lines in FIGS. 1A and 1B is secured to the inboard faces of body portions 10 and 10'. The forces asserted on the respective brackets 114 and 120 and the corresponding brackets on the load which interleaf with multi-finger brackets 114 and 120 are tensile forces. When the car is provided with a load, coupler 110 is rotated to the right as it appears in FIG. 5 until hole 130 is in alignment with hole 132, and a pin may be inserted to hold the coupler 110 in its loaded car position.

Figure 4:
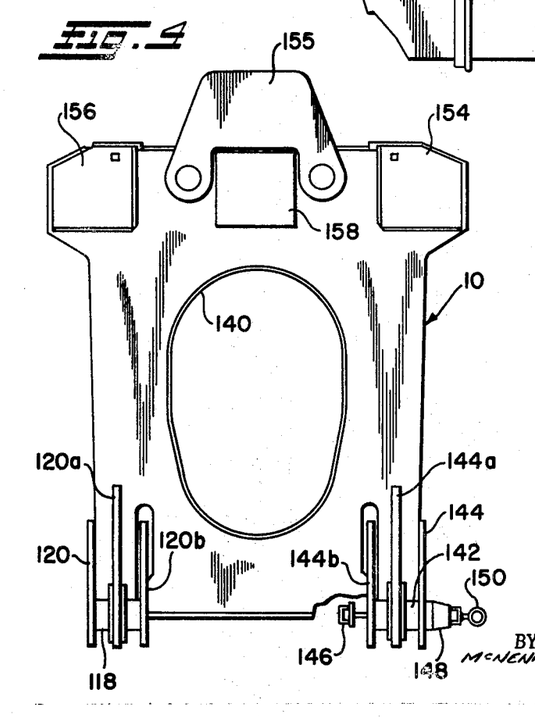
FIG. 4 is a view of the inboard end of the body portion shown in FIG. 1A as it appears in the plane indicated by the line 4–4 in FIG. 1A.

FIG. 4 shows an end view of the inboard face of car body portion 10. Aperture 140 is conveniently provided to accommodate protruding shaft, or member, integral with the load. FIG. 4 shows the multi-fingered nature of bracket 120 showing fingers 120, 120a, and 120b. Truss hinge pin 118 is shown in place. Its opposite member is truss hinge pin 142 shown in place in end plate members 144, 144a, and 144b. To aid in installation and removal of the truss pins 118 and 142, there are provided a pilot handle 146, a pilot block 148 and a pulling eye 150. When the pins are in place, these parts are removed and stored in a suitable storage container such as storage container 152 (FIG. 1A) on plate 40 of equalizer beam 32. Also shown in FIG. 4 are the compression plates 154, 155, 156, and 158 against which the upper marginal portions of the load bear in compression, 155 being attached only for outsize loads.

Figure 7:
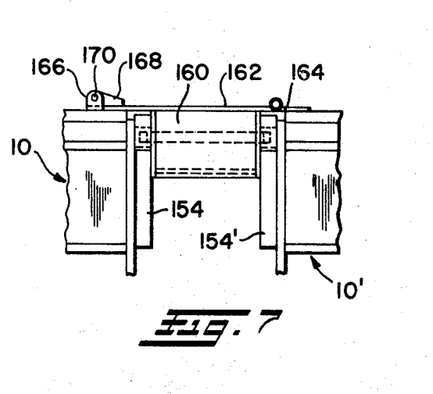
FIG. 7 shows details of a hinged spacing element utilized in maintaining the spacing between the cars when empty.

When the car is empty, spacing means are provided at the upper marginal edge for coaction between compression pads 154 and 154', for example, as shown in FIG. 7. Thus a spacer 160 is provided and secured to plate 162. Plate 162 is secured by means of hinge 164 to body portion 10'. Bracket 166 secured to body portion 10 receives leaf 168 welded to plate 162 and is secured by means of pin 170. When not in use, i.e. the car is loaded, spacer 160 is folded back on hinge 164 to the position as shown in FIG. 1B.

As indicated above, FIGS. 8, 9, 10, and 11 relate to the equipment which is provided to permit swinging of the outboard extremity 14 of car body portion 10 due to the track configuration for the wheeled truck portion to pivot about the vertical axis of trunnion 78. Such pivoting will cause the outboard extremity of vertical body portion 10 to describe an arcuate path in a horizontal plane. Such a motion is accommodated by a roller nest which is adapted and constructed to support the major portion of one-half of the weight of the load carried between the car body portions.

Figure 8:
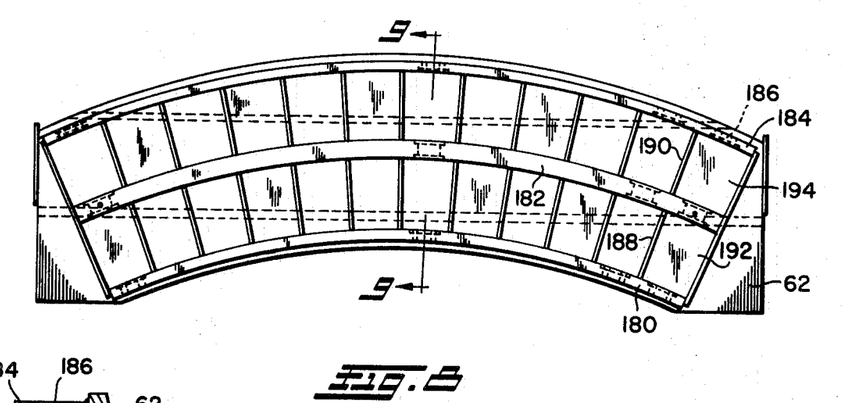
FIG. 8 is a plan view on an enlarged scale of a roller nest with rollers omitted and upon which the outboard extremity of the body portion is carried.

FIG. 8 shows a roller nest in top plan view on an enlarged scale. The base of the roller nest is platen 62. Upstanding circumferential segments 180, 182 and 184 provide support for roller pins such as roller pin 186. The upstanding segments or ribs 180, 182 and 184 have the same center, but radially outwardly increasing diameters according to the length of the rollers. Ribs 180, 182 and 184 are welded to platen 62. Radial bars 188 and 190, for example, divide the roller chambers.

Figures 11, 13:
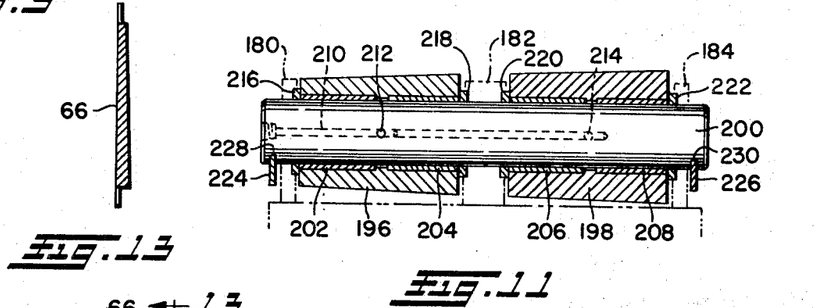
FIG. 11 is a cross-sectional view through a typical tapered roller assembly carried in each of the roller compartments shown in FIG. 8 and in section in FIG. 9.
FIG. 13 is a cross-sectional view of the roller plate shown in FIG. 12 showing the taper for coaction with the tapered rollers.

As shown in FIG. 11, two roller portions are mounted on the same roller pin. Thus, a roller will be disposed in chamber 192 and on the same pin axis a second roller will be disposed in chamber 194. In FIG. 8 there are shown, therefore, 24 chambers each adapted to receive a roller such as shown in FIG. 11, there being two such rollers, e.g. rollers 196 and 198, on pin 200. Roller 196 is provided with suitable bushings 202 and 204, and roller 198 is likewise provided with suitable bushings 206 and 208. Suitable lubricating ports are provided such as ports 210, 212 and 214. Washers 216 and 218 are provided at each end of the individual rollers and are partially recessed in the upstanding ribs 180 and 182. In like manner, roller segment 198 is provided with washers 220 and 222, each partially recessed in the corresponding upstanding rib portions 182 and 184, respectively. Each of the ends of roller pin 200 is maintained in place by means of a keeper such as, for example, keepers 224 and 226. Such keepers coact with notches 228 and 230 in the respective ends of roller pin 200. The keepers 224 and 226 are bolted to the respective ribs 180 and 184. The structure in each of the other chambers of the roller nest is essentially the same as has been described in respect of FIGS. 8 and 11.

Figure 9:
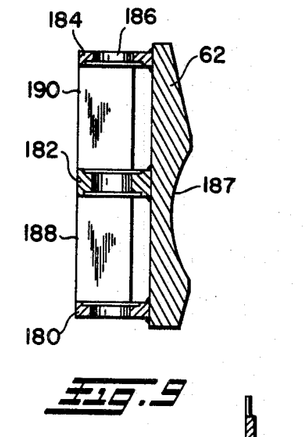
FIG. 9 is a cross-sectional view of the roller nest with the rollers removed as it appears in the plane indicated by the line 9–9 in FIG. 8.

FIG. 9 is typical cross-sectional view through the roller nest and shows the configuration of the platen 62, the upstanding ribs 180, 182 and 184, and the chamber-dividing bars 188 and 190.

Figure 10:
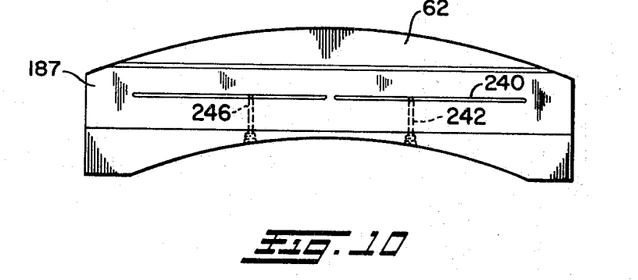
FIG. 10 is a bottom view on a reduced scale relative to FIG. 8 of the roller platen.

FIG. 10 is a view of the bottom surface of the platen 62, and shows the location of lubricant grooves 240, 242 and 246.

Figure 12:
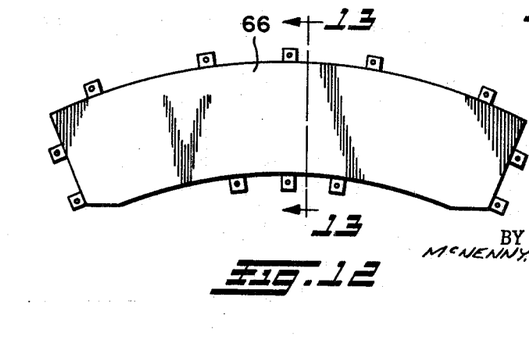
FIG. 12 is a plan view of a roller plate carried by the outboard extremity of the body portion for rolling contact with the roller nest.

FIG. 12 is a plan view of the roller plate 66 which is secured to the underside of the outboard extremity 14. In the preferred embodiment, the rollers, for example rollers 196 and 198, are tapered and, accordingly, the cross section of roller plate 66 is correspondingly tapered.

FIG. 13 is a cross-sectional view of roller plate 66 showing the taper for rolling coaction with the tapered rollers of the roller nest.

In accordance with the foregoing specific example, the supporting body portions and the lading may be elevated a distance of 12 inches and moved laterally a distance of about 14 inches either side of the center line. These movements are conveniently accomplished by a diesel-hydraulic system. The car so constructed and loaded is capable of traveling with the load in the foregoing displacements. A car so designed is in accordance with A.A.R. specifications for design, fabrication and construction of freight cars adopted September 1, 1964, for clearances, etc. A car constructed in accordance herewith is capable of carrying 78,750 lbs. per axle which in the case of the device shown in FIGS. 1A and 1B amounts to 1,575,000 lbs. A specific embodiment of this car weighs about 500,000 lbs. and has a capacity, therefore, of better than 1,000,000 lbs. Its Cooper rating at 1,575,000 lbs. is E92.25.

What is claimed is:

1. A wheeled vehicle comprising a pair of separable vehicle portions adapted to be separated and to support a load therebetween, each portion including:
   a. a wheeled truck assembly;
   b. a body portion having inboard and outboard ends;
   c. a yoke including trunnion means at its outboard end, said yoke being secured to said body adjacent the inboard end for relative rotation about a horizontal axis;
   d. a support carried by the wheeled truck assembly supporting the outboard end of said body and the other end of said yoke;
   e. means coacting with said support for laterally relatively moving the outboard end of said support with respect to said wheeled truck assembly; and
   f. means operatively connected between said outboard end of said support and said outboard end of said body for vertically moving the outboard end of said body with respect to said support.

2. A wheeled vehicle in accordance with claim 1 wherein the support for the outboard end of said body includes a platen and roller means coacting therewith for relative movement in a horizontal plane between the outboard end of said body and said support, and vertically movable platen support means for supporting said platen and roller means.

3. A wheeled vehicle in accordance with claim 2 in which the confronting surfaces of the platen support and the platen are configured for limited relative rotation about a horizontal axis normal to the longitudinal axis of said vehicle.

4. A wheeled vehicle in accordance with claim 3 in which the confronting surface of the platen support is cylindrical, and the mating confronting surface of the platen is concave and geometrically configured to receive the cylindrical surface of said platen.

5. A wheeled vehicle in accordance with claim 1 in which the support includes a carriage body, a yoke support arm on said carriage extending in an inboard direction and including trunnion engaging and securing means and vertically extensible support means on said carriage body.

6. A wheeled vehicle in accordance with claim 5 in which the vertically extensible support means includes a horizontally disposed platen and a nest of rollers adapted to coact with said outboard end of said body for relative arcuate motion.

7. A wheeled vehicle in accordance with claim 5 in which the carriage body includes wheels on the underside thereof for lateral movement of the carriage with respect to the wheeled truck assembly.

8. A wheeled vehicle in accordance with claim 1 in which the means for laterally relatively moving the support includes a pair of oppositely acting hydraulic cylinders coacting between the wheeled truck assembly and the support.

9. A wheeled vehicle in accordance with claim 1 in which the wheeled truck assembly includes a pair of longitudinally spaced trucks and a load equalizing body supported at each end by one of said trucks, respectively, and the support (d) is carried by said body.